INVENTORS
ROBERT HIGH HALL
GEOFFREY HOWARD
CYRIL CHARLES OVENS

BY Larson and Taylor

INVENTORS
ROBERT HIGH HALL
GEOFFREY HOWARD
CYRIL CHARLES OVENS

United States Patent Office 3,145,636
Patented Aug. 25, 1964

3,145,636
SERVICING EQUIPMENT FOR NUCLEAR
REACTORS
Robert Hugh Hall, Harwell, Didcot, and Geoffrey Howard and Cyril Charles Ovens, Culcheth, Warrington, England, assignors to United Kingdom Atomic Energy Authority, London, England
Filed Apr. 13, 1959, Ser. No. 805,918
Claims priority, application Great Britain Apr. 15, 1958
11 Claims. (Cl. 95—86)

This invention relates to servicing equipment for nuclear reactors.

During the operating life of a nuclear reactor servicing operations may have to be carried out on the structure of the reactor. It is required that such operations be effected remotely owing to the hazards arising from radiation etc.

Television cameras have been designed of elongate cylindrical form suitable for passing through the fuel element and control rod channels of a graphite moderated nuclear reactor, to discover faults in the channels and locate extraneous objects.

The present invention extends the usefulness provided by television viewing in the servicing of nuclear reactors.

According to the invention a television viewing facility for remote examination of the internal structure of a nuclear reactor comprises a television camera mounted on and movable relative to an arm which is itself movable relative to a support member and means for manipulating said support member, arm and camera so that they can be aligned for insertion and withdrawal along a hole giving access to said internal structure and so that after insertion the camera and arm can be moved from the aligned position to sight the camera in diverse direction.

One embodiment of the invention will now be described by way of example with reference to the accompanying drawings in which:

FIGS. 1 and 2 respectively show the upper and lower halves of the embodiment in perspective form.

FIG. 10 is a detail of FIG. 1 viewed in the direction of the arrow 10.

Figure 1:
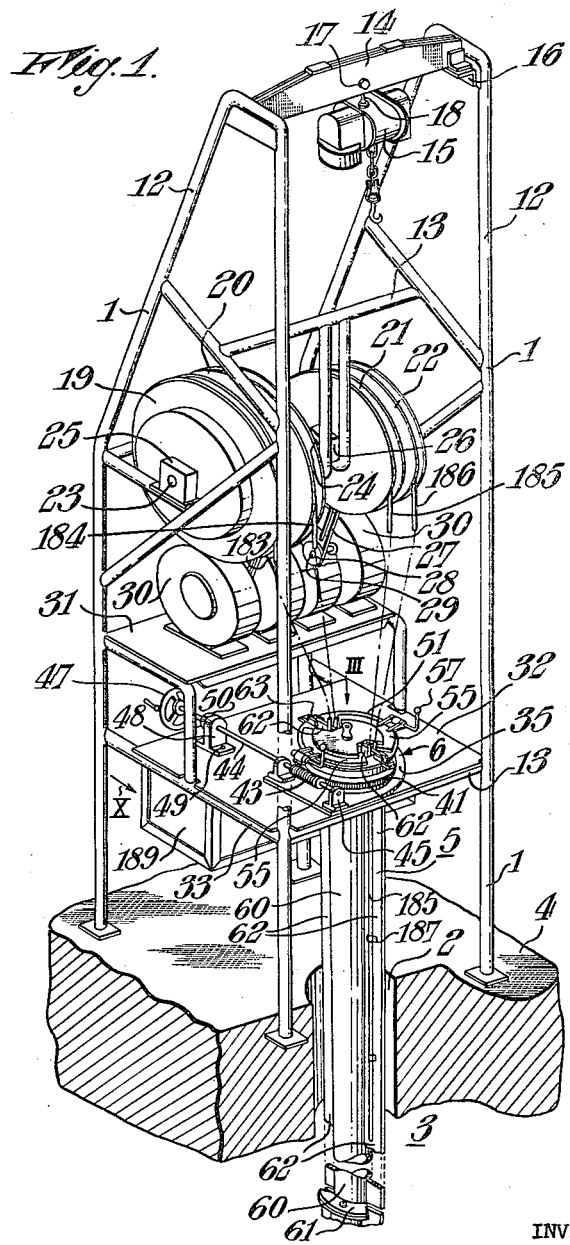

The facility shown in the drawings is intended for the inspection by television of an internal void in the structure of a nuclear reactor where the only access into the void is through a limited number of vertical holes in the top of a thick shielding structure containing the core of the reactor.

Figure 2:
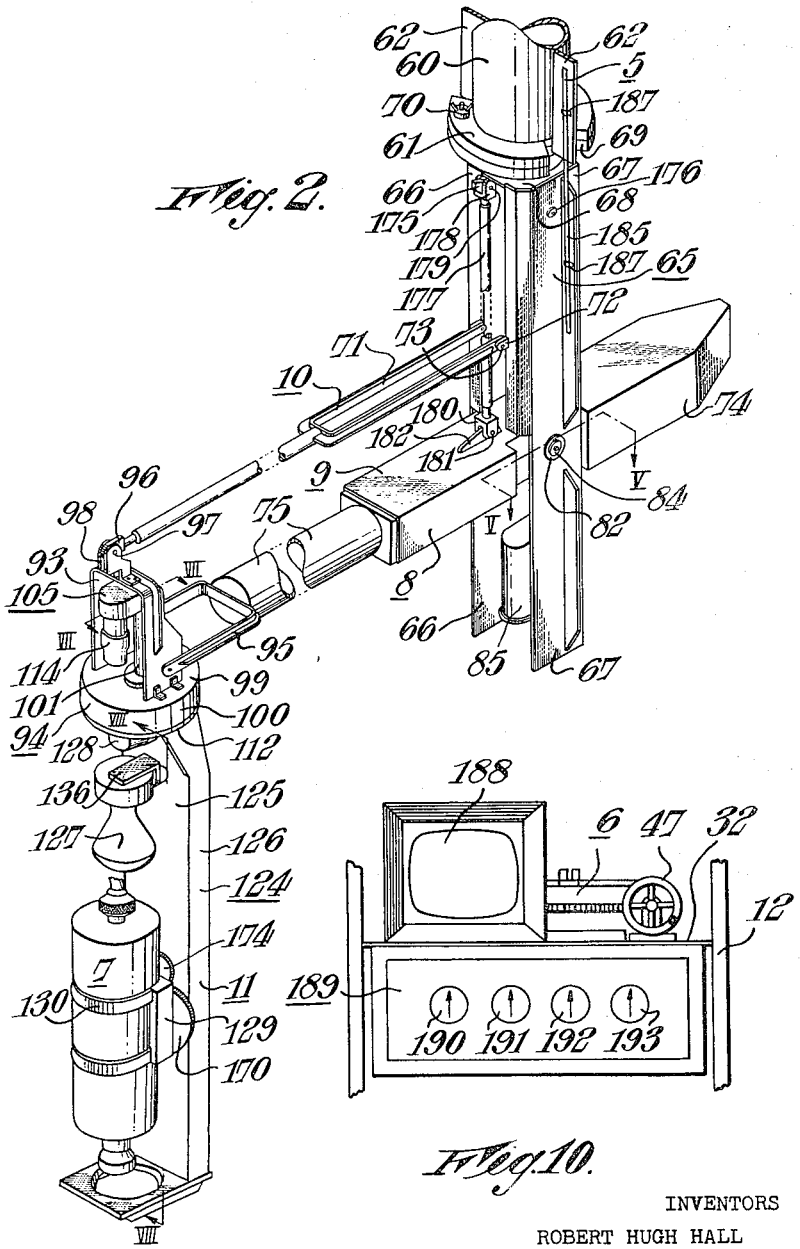

In FIGS. 1 and 2 there is shown a tubular structure 1 situated above a vertical inspection hole 2 providing access to a discharge void 3 of a nuclear reactor through a top shielding structure 4. A support member in the form of sectional and retractable post 5 is suspended from a turntable 6 on the structure 1 and passes through the inspection hole 2 into the void 3.

The post 5 supports a compact cylindrical television camera 7 via an intermediate parallel linkage 8 comprising a pivoted arm 9 and a forked link 10. The camera 7 is rotatable about two mutually perpendicular axes on a camera support head 11 and can be positioned in the void 3 by rotation and vertical movement of the post 5 and by manipulation of the parallel linkage 8.

The structure 1 comprises parallel vertical frames 12 joined by tubular cross members 13. A cross head 14 at the top of the structure 1 carries a motor driven winch 15 and is supported by brackets 16 on the frames 12. The cross head 14 is fitted with a transverse bolt 17 from which the winch 15 is suspended by means of a ring bolt 18.

Winding drums 19, 20, 21 and 22 of the type accommodating cable in the form of a flat volute spiral are mounted on shafts 23 and 24 carried by bolster blocks 25 and 26 on the structure 1. The drums 19 and 20 are independently rotatable on the shaft 23 while the drums 21 and 22 which are of smaller diameter than the drums 19 and 20 are independently rotatable on the shaft 24.

The drums 19, 20, 21 and 22 are of the spring return type being coupled by chains 27 and sprockets 28 to the drive shafts 29 of individual spring return drums 30 mounted on a plate 31 carried by the structure 1 below the drums 19, 20, 21 and 22.

Figure 3:
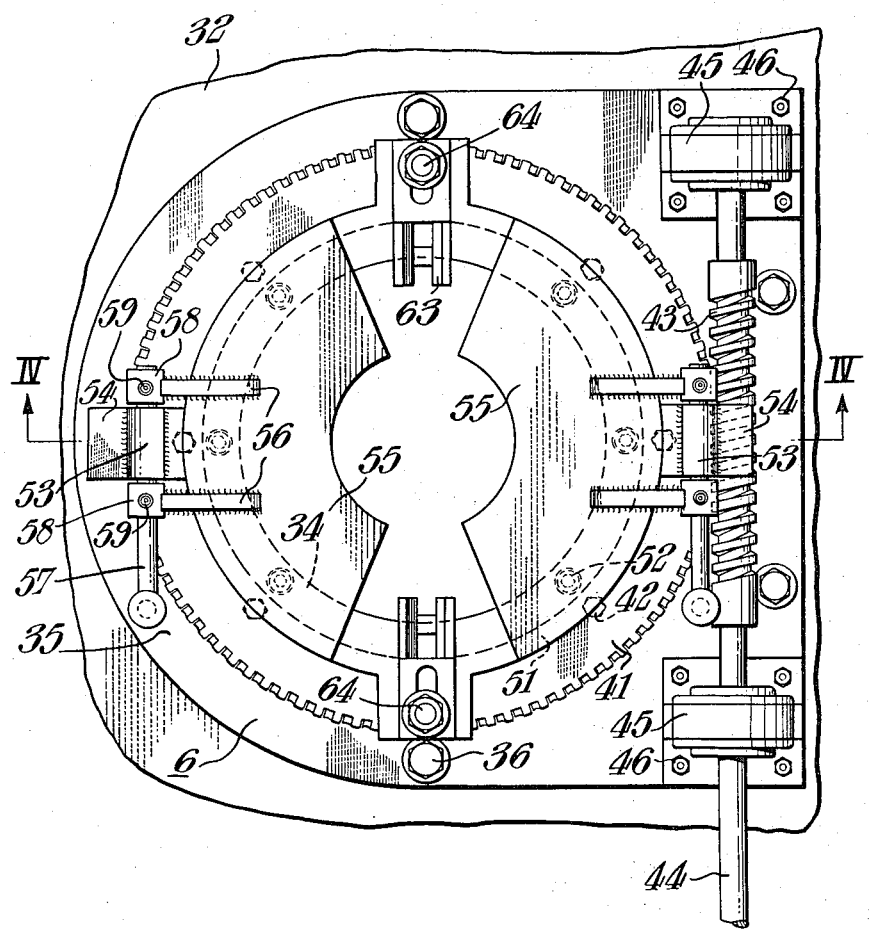
FIG. 3 is a detailed plan of that part of FIG. 1 indicated by the arrow III.
Figure 4:
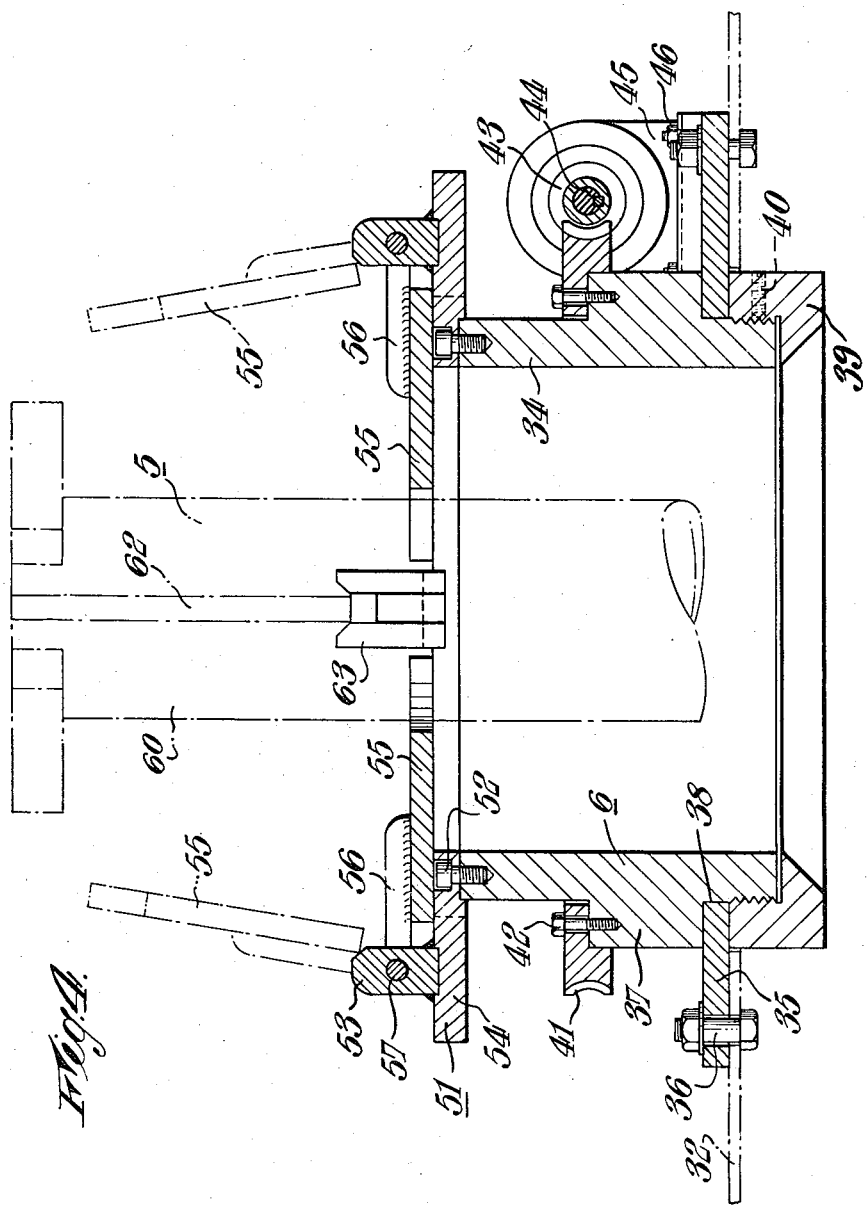
FIG. 4 is a section along the line IV—IV in FIG. 3.

A plate 32 carried by cross members 13 and 33 of the structure 1 supports the turntable 6 which, as shown in FIGS. 3 and 4, comprises a tubular body 34 rotatable on a base plate 35 which is fixed to the plate 32 by bolts 36. The body 34 has an external flange 37 at which it rests in a hole 38 in the base plate 35. A retaining ring 39 is fixed by grub screws 40 to the body 34 below the base plate 35 and a worm wheel 41 is fixed to the flange 37 by bolts 42. A three-start worm 43 coupling with the worm wheel 41 is keyed to a shaft 44 supported by bearing brackets 45 fixed to the base plate 35 by bolts 46. End location of the shaft 44, which terminates in a hand wheel 47, is provided by a bearing bracket 48 mounted on the plate 32 by bolts 49. The bracket 48 supports a potentiometer 50 which is driven by the shaft 44 to provide an indication of the angular position of the turntable 6 by indicating the related angular position of the shaft 44. An annular end plate 51 is fitted to the body 34 of the turntable 6 by socket headed screws 52. Bearing blocks 53 are welded to radial lugs 54 formed integrally with the plate 51. Two part-annular flaps 55 are supported by arms 56 on cranked shafts 57 carried by the bearing blocks 53. The arms 56 are welded to the flaps 55 and have integral bushes 58 fixed by grub screws 59 on the shafts 57.

The post 5 is composite in form being assembled from basic tubular units 60 bolted together at end flanges 61. Longitudinal flanges 62 welded to the tubular units 60 co-operate with slotted guides 63 fixed to the turntable 6 on the annular end plate 51 by bolts 64 (see the chain dotted outline in FIG. 4). The post 5 can be raised vertically from the position shown in FIG. 1 by means of the winch 15, the guide 63 ensuring that rotation of the turntable 6 consequently produces rotation (whilst allowing for vertical movement) of the post 5.

As shown in FIG. 2 the arm 9 and the forked link 10 are pivoted on a framework 65 bolted to the lower end of the post 5. The framework 65 comprises parallel side members 66 and 67 welded to an end plate 68 carried by a flange 69. The framework 65 is attached by bolts 70 to the post 5 at the flange 69 and the lowermost flange 61 of the post 5.

Figure 5:
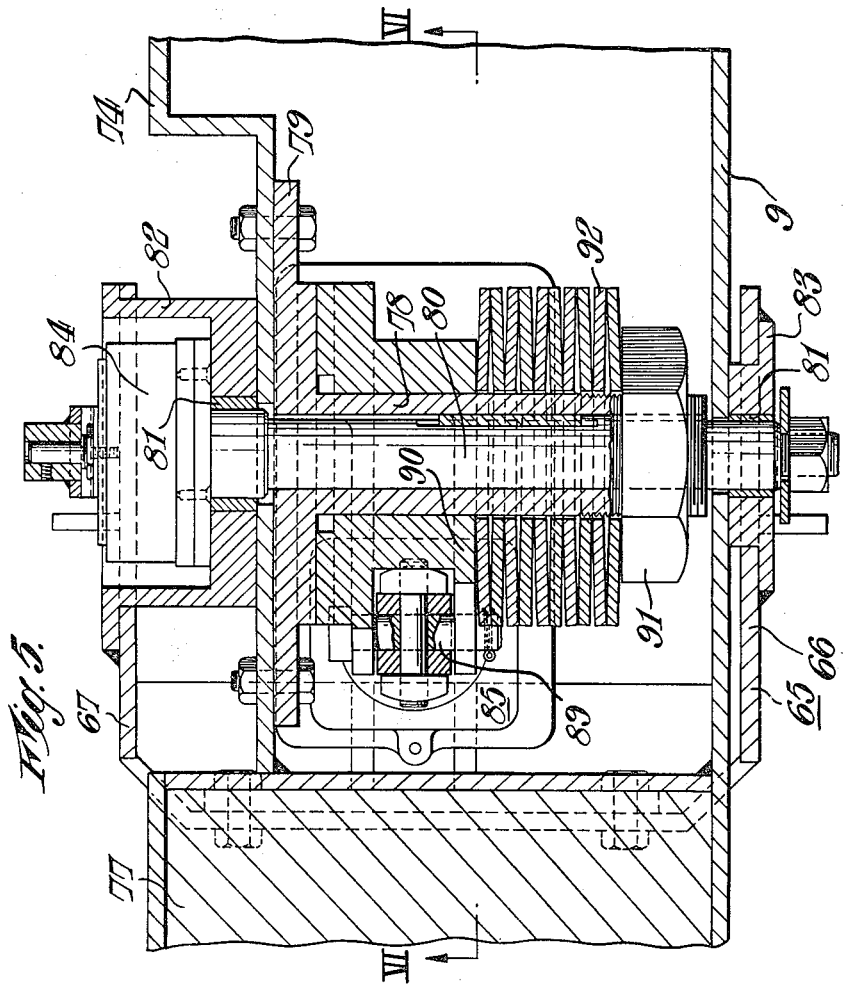
FIG. 5 is a detailed section along the line V—V in FIG. 2.

The link 10 which terminates in a forked end 71 is pivoted on the framework 65 at lugs 72 welded to the side members 66 and 67, the forked end 71 providing for pivoting of the link 10 on the lugs 72 by pivot pins 73. The arm 9 comprises a body 74 of rectangular cross section fitted with a tubular extension 75. The arm 9 is pivoted on the framework 65 at the centre of the body 74 which is half filled with lead 77 providing a counterbalancing weight for the arm 9 (see FIG. 5). As shown in FIG. 5 a sleeve 78 bolted at an end flange 79 inside the body 74 is keyed to a shaft 80 extending between the side members 66 and 67 of the framework 65. The shaft 80 is rotatable in bearing bushes 81 fitted in housings 82 and 83 welded to the side members 67 and 66. The housing 82 is of dished form to accommodate a potentiometer 84 which is coupled with the shaft 80 to provide remote indication of the angular position of the arm 9.

Figure 6:
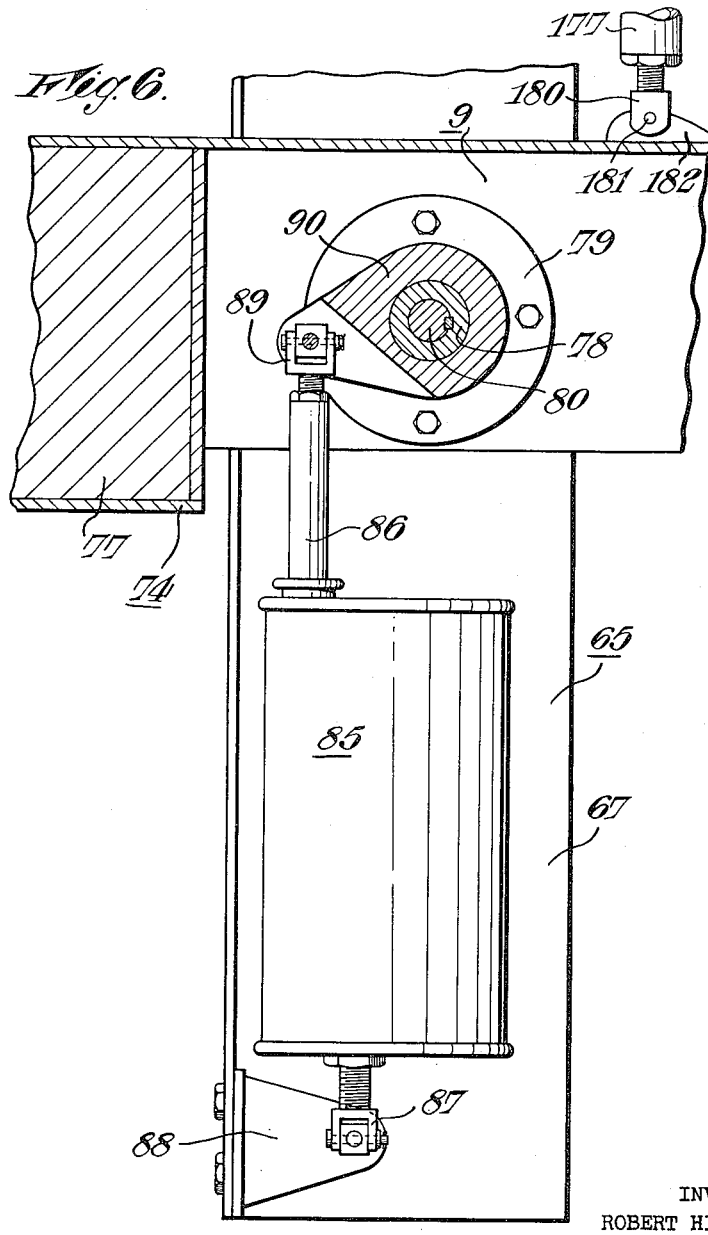
FIG. 6 is a section along the line VI—VI in FIG. 5.

As shown in FIG. 6 an electrically operated linear actuator 85 having an actuator shaft 86 is mounted at the lower end of the framework 65 by a universal coupling 87 and a bracket 88. The bracket 88 is bolted between the side members 66 and 67 of the framework 65. The actuator shaft 86 is connected by a universal coupling 89 with a lever arm 90 clamped on the sleeve 78 against the flange 79 by a nut 91 acting through clutch means provided by dished spring washers 92. (See FIG. 5.)

Referring to FIG. 2 the camera support head 11 is mounted on the parallel linkage 8, comprising the arm 9 and the link 10, by means of a U-shaped bridge member 93. The member 93 is bolted to a turret head 94 forming part of the camera support head 11 and is pivoted between the jaws of a bifurcated member 95 welded to the extension 75 of the arm 9. The link 10 is connected with the bridge member 93 by a coupling plate 96 pivoted on a pin 97 between two brackets 98 riveted to the bridge member 93.

Figure 7:
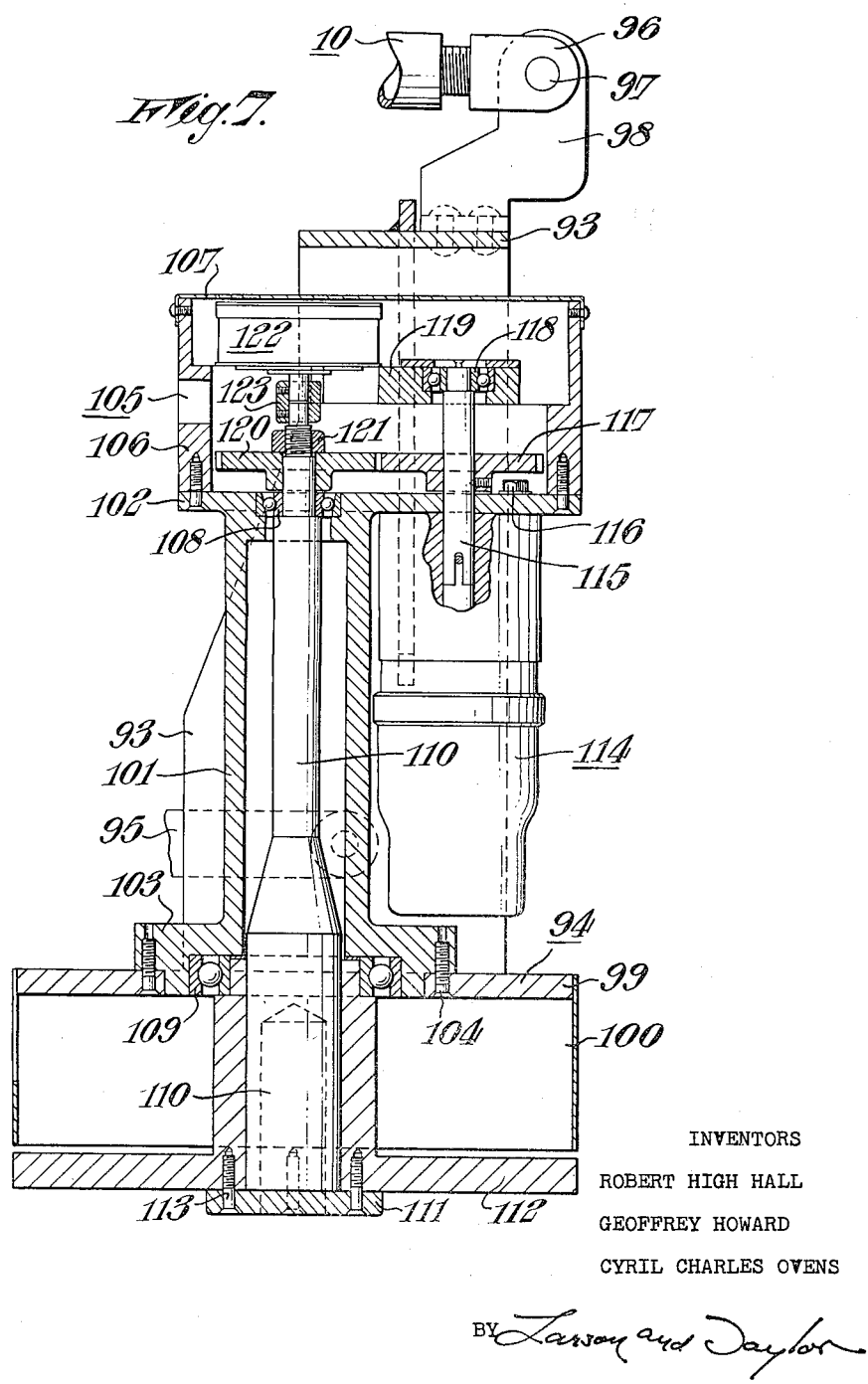
FIG. 7 is a detailed section along the line VII—VII in FIG. 2.

As shown in FIG. 7 the turret head 94 comprises a fixed mounting plate 99 fitted with a tubular shroud 100. A tubular pillar 101 having upper and lower end flanges 102 and 103 is attached to the mounting plate 99 at the lower end flange 103 by bolts 104. The upper end flange 102 of the pillar 101 forms the base of a housing 105 including a body 106 and a cover plate 107. The pillar 101 is counterbored at both ends to hold ball races 108 and 109 which support a shaft 110 passing through the pillar 101. The shaft 110 has an integral end flange 111 for the attachment of a sleeved face plate 112 to the shaft 110 by bolts 113. An electrically powered rotary actuator 114 having an output shaft 115 is mounted underneath the upper end flange 102 of the pillar 101 by bolts 116. The output shaft 115 of the actuator 114 is fitted with a pinion 117 and is located inside the housing 105 by a ball race 118. The ball race 118 is carried by an internal flange 119 inside the body 106 of the housing 105. The pinion 117 on the shaft 115 couples with a pinion 120 retained on the shaft 110 by a nut 121. A potentiometer 122 carried inside the housing 105 by the internal flange 119 is coupled with the shaft 110 by a bush 123. The potentiometer 122 provides remote indication of the angular position of the shaft 110 and hence of the face plate 112.

Figure 8:
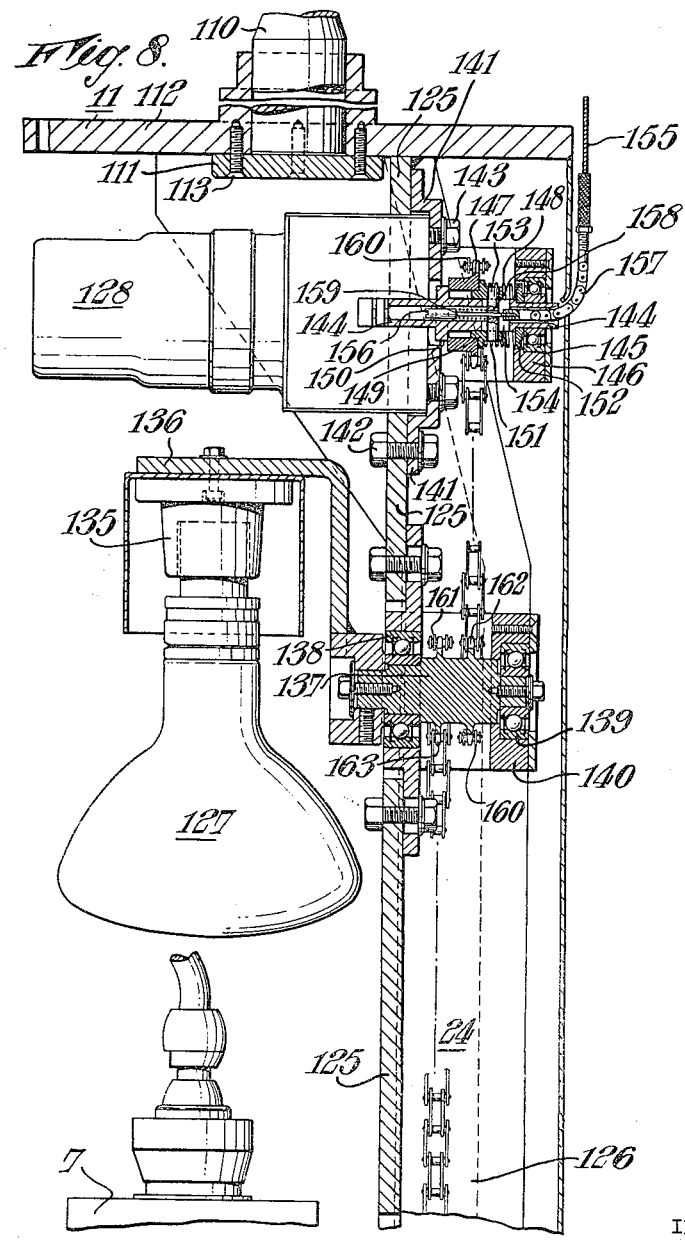
FIGS. 8 and 9 show in two halves the section along the line VIII—VIII in FIG. 1.
Figure 9:
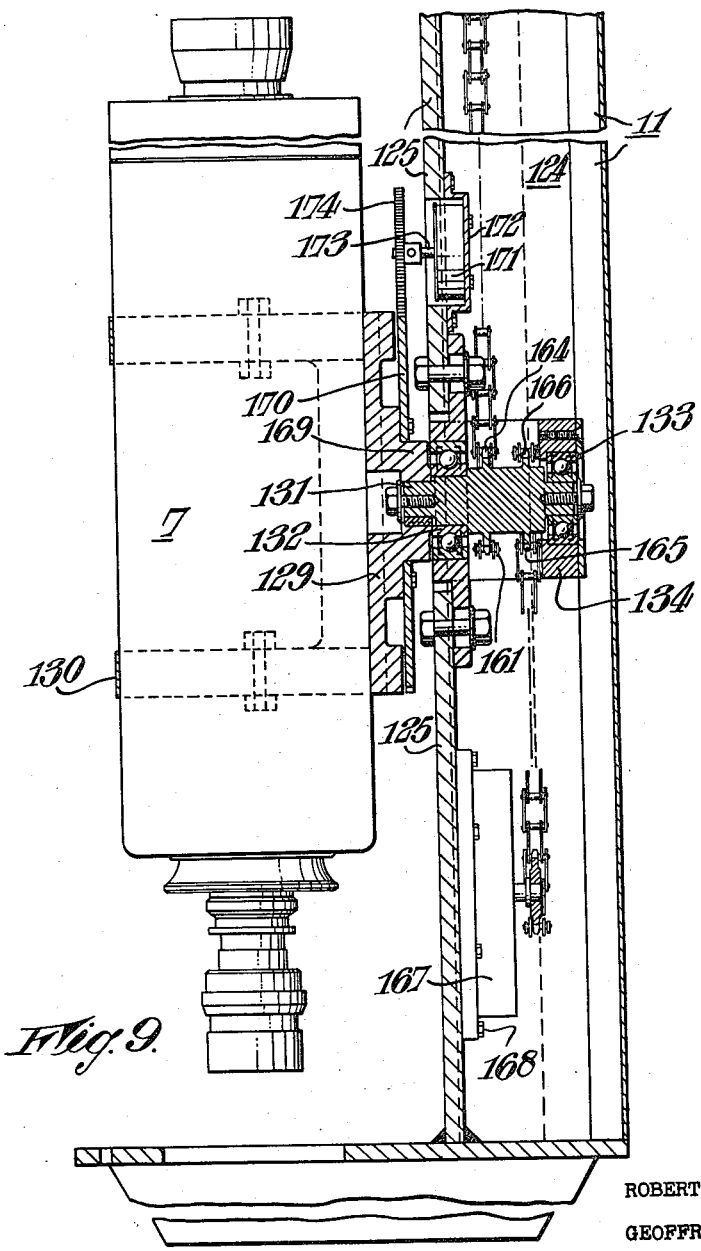

As shown in FIGS. 2, 8 and 9 a girder frame 124 having a centre web 125 and side flanges 126 is welded to the face plate 112. The girder frame 124 supports the television camera 7, an associated spotlight 127 and an electrically powered rotary actuator 128. The camera 7 is attached to a rotatable bracket 129 by straps 130. The bracket 129 is bolted to a shaft 131 rotatable in ball races 132 and 133 which are mounted in a housing 134 bolted to the centre web 125 of the girder frame 124. The spotlight 127 is screwed into a connector socket 135 bolted to a rotary bracket 136 carried by a shaft 137. The shaft 137 is rotatable in ball races 138 and 139 mounted in a housing 140 also bolted to the centre web 125 of the girder frame 124. The rotary actuator 128 is mounted on the girder frame 124 by means of an intermediate dished plate 141. The plate 141 is fixed on the centre web 125 of the girder frame 124 by bolts 142 and the actuator 128 is attached to the plate 141 by bolts 143. The actuator 128 has a tubular output shaft 144 which passes through the plate 141 and is additionally supported by a ball race 145 mounted in a bracket 146 formed integrally with the plate 141. The output shaft 144 of the actuator 128 carries a chain sprocket 147 which is supported by a sleeve 148 slidable on the shaft 144. The sprocket 147 is driven by the shaft 144 through spring clutch means provided by a compression spring 151 clamped between an external flange 149 on the sleeve 148 and an external flange 150, on the shaft 144. The spring 151 acts between the flange 149 on the sleeve 148 and a fixed thrust washer 152 on the shaft 144. The sleeve 148 is fitted with a pin 153 which passes diametrically through a longitudinal slot 154 in the shaft 144. The pin 153 prevents rotation whilst allowing axial movement of the sleeve 148 on the shaft 144. The sprocket 147 can be withdrawn from engagement with the flange 150 on the shaft 144 by a flexible cable 155 which is coupled with a pin 156 slidable inside the tubular shaft 144. The pin 151 which is coupled with the cable by a short length of chain 157 passes through a hole 158 drilled in the pin 153 and is coupled therewith by a compression spring 159.

The actuator 128 is coupled to rotate the camera 7 and the spotlight 127 in unison by chains 160 and 161. The chain 160 couples the sprocket 147 on the actuator shaft 144 with a sprocket 162 formed integral with the shaft 137 carrying the spotlight 127. A second sprocket 163 formed integral with the shaft 137 is coupled by the chain 161 with a sprocket 164 formed integral with the shaft 131 carrying the camera. A second sprocket 165 formed integral with the shaft 131 is coupled by a chain 166 to drive a spring return drum 167 mounted on the centre web 125 of the girder frame 124 by bolts 168. The spring return drum 167 serves to bias the camera 7 and spotlight 127 into positions which are in alignment with the longitudinal axis of the frame 124. The bracket 129 carrying the camera 7 has a circular mounting boss 169 fitted with a pinion gear 170. A potentiometer 171 mounted on the girder frame 124 by a bracket 172 has a drive shaft 173 fitted with a pinion gear 174 which is coupled with the pinion gear 170. The potentiometer 171 is driven in correspondence with the rotation of the camera 7 and thus provides remote indication of the angular position of the camera 7 and the spotlight 127.

As shown in FIG. 2 a trip lever 175 pivoted on a shaft 176 extending between the side members 66 and 67 of the framework 65 is connected to rotate the arm 9 through a tubular strut 177. The strut 177 has one forked end 178 coupled with the trip lever 175 by a pivot pin 179 and a second forked end 180 coupled by a pivot pin 181 with a plate 182 welded to the body 74 of the arm 9.

The drums 19, 20, 21 and 22 carry service cables for the television camera 7, etc. A multicore service cable 183 for the television camera 7 is carried by the drum 19. A multicore power line 184 for the actuators 85, 114 and 128 and the spotlight 127 is carried by the drum 20. A multicore cable 18 providing connections for the potentiometers 84, 122 and 171 is carried by the drum 21. A compressed gas line 186 for cooling the camera 7 and for energising a gas grab when fitted to the camera head 11 is carried by the drum 22. The cables 183, 184, 185 and the gas line 186 pass down the post 5 attached to the longitudinal flanges 62 by clips 187. A viewing monitor 188 (see FIG. 10) is located on the plate 32 which supports the turntable 6. Control and video units etc. for the television camera 7 are supported in a rack 189 slung on the structure 1 below the plate 32.

In FIGS. 1 and 2 the facility is shown in an assembled condition ready for operation. The assembly of the facility to this condition is as follows:

First, the structure 1 is positioned over the inspection hole 2 in the top shielding structure 4 of the reactor. Next the parallel linkage 8 and its supporting framework 65 is suspended from the winch 15 and lowered through the turntable 6 into the inspection hole 2. Lowering is continued until the parallel linkage etc. is supported with the end flange 69 of the framework 65 resting on the flaps 55 of the turntable 6 which are in a lowered position. In the above operation it is arranged that the parallel linkage 8 is in line with the framework 65 so that the body 74 of the arm 9 rests between the side members 66 and 67 of the framework 65. The next step in the sequence of assembly is to bolt a unit 60 of the post 5 to the framework 65 at the end flange 69 and the cables 183, 184, 185 etc. are attached to the longitudinal flanges 62 of the unit 60 by the clips 187. The assembly is now raised a small amount by means of the winch 15 so that the flaps 55 of the turntable 6 can be moved to a raised position allowing lowering of the assembly until the upper end flange 61 of the unit 60 of the post 5 is supported by the flaps 55 in the lowered position. During lowering of the assembly cable is run off from the drums 19, 20, 21 and 22 against the restraint of the spring return drums 30. Further units 60 are added to the post 5 in the above manner so that the parallel linkage 8 supporting the television camera 7 etc. is lowered into the void 3 until a required insertion is reached. The parallel linkage 8 is now extended by rotation of the arm 9 under the action of the linear actuator 85. The angular position of the arm 9 is indicated by a meter 190 (FIG. 10) on the rack 189. A signal related to the angular position of the arm 9 is transmitted to the meter 190 by the potentiometer 84 which is coupled to rotate in correspondence with the arm 9.

The camera 7 is positioned for viewing in the void 3 by manipulation of the parallel linkage 8 and rotation of the post 5 by means of the turntable 6. The turntable 6 is rotated by means of the handwheel 47 and the degree of rotation of the post 5 is registered on a meter 191 (FIG. 10) also mounted on the rack 189. A signal related to the angular position of the lower post 5 is transmitted to the meter 191 by the potentiometer 50 which is rotated in correspondence with the rotation of the turntable 6. The camera can virtually scan a sphere from any position defined by the position of the post 5 (depth of insertion and angle of rotation) and the angle of the arm 9 by rotation of the turret head 94 and the camera 7. The number of positions from which the camera can virtually scan a sphere is infinite within the confines of a cylinder having a radius governed by the length of the arm 9 and a height governed by movement of post 5. The turret head 94 is rotated by means of the actuator 114 and the camera 7 in unison with the spotlight 127 by means of the actuator 128. The angular positions of the turret head 94 and the camera 7 are registered by meters 192 and 193 mounted on the rack 189 (see FIG. 10). Signals related to the angular positions of the turret head 94 and the camera 7 are transmitted to the meters 192 and 193 by the potentiometers 122 and 171 which are rotated in correspondence with the rotation of the turret head 94 and the camera 7. The meters 190, 191, 192 and 193 thus enable an operator to envisage the location and viewing alignment of the camera 7 in the void 3.

The necessary alignment of the parallel linkage 8 with the post 5 and the camera 7 with its supporting frame 124 is ensured should the electric supply fail to the various actuators so that the assembly can be withdrawn under all circumstances through the inspection hole 2. Assuming that the electric supply to the facility fails with the parallel linkage 8 extended as shown in FIG. 2 and with the camera 7 rotated out of line with the frame 124. By pulling on the cable 155 the sprocket 147 is freed on the output shaft 144 of the actuator 128 and the camera 7 and spotlight 127 are rotated into line with the frame 124 under the biasing action of the spring return drum 167 (see FIG. 9). Now on attempting to withdraw the assembly through the inspection hole 2 the trip lever 175 catches on the shielding structure 4, the friction clutch means provided by the spring washers 92 slips, and the arm 9 etc. is rotated into alignment with the post 5 etc. through the strut 177. Therefore the assembly can be withdrawn through the inspection hole 2.

The camera 7 is provided with automatic light compensation and remotely adjustable focusing arrangements. The camera 7 may be cooled by gas from the pipe 186 when the facility is required to work in an ambient temperature of about 100° C., normal ambient temperature being about 40° C. The camera support head 11 can be fitted with a pneumatically energised grab adapted to grasp and move objects inside the void 3.

Modifications can be made to the facility to enable its use in a variety of ways besides the use described above in relation to the inspection of a relatively large void through a limited means of access. For example the facility may be used to inspect the inside of the pressure vessel or the core structure contained within the pressure vessel of a gas cooled graphite moderated nuclear reactor. In this case the facility is modified to enable insertion through charge tubes permitting access to the inside of the pressure vessel. The modifications will include the provision of suitable glanding arrangements to prevent gas leakage from the pressure vessel, the adaptation of the facility to allow insertion through horizontal holes and the provision of a multilens turret head in order to permit close inspection, for example, of an internal weld.

We claim:

1. Viewing apparatus comprising elongated support means having a suspension section and a head section interconnected by an arm, said arm being connected to one end portion of the suspension section by a joint for pivotal movement about an axis transverse to the longitudinal axis of the suspension section and said head section being connected to one end portion of the arm by a joint for pivotal movement about an axis transverse to the longitudinal axis of the arm, said joints connecting said arm to said head section and said suspension section being so formed and operable with the sections connected thereto to permit the suspension section, arm and head section to assume common alignment along an axis extending in the same direction as the longitudinal axis of said suspension section, television camera means mounted on the head section for pivotal movement about an axis transverse to the longitudinal axis of the head section, means for operating said arm, head section and camera means so that in one operable position said suspension section, arm, head section and camera means are in common alignment and in other operable positions are out of common alignment, and actuator means operating said means and connected with the other end portion of the suspension section for causing said pivotal movement of the arm, of the head section, and of the camera means.

2. Viewing apparatus according to claim 1 further comprising means connected with the other end portion of the suspension section for causing said head section to rotate about its longitudinal axis.

3. Viewing apparatus according to claim 1 wherein the camera means is mounted on the head section for viewing in a plane extending parallel to said longitudinal axis of the head section.

4. Viewing apparatus according to claim 1 wherein the arm and the head section are mounted to pivot about parallel axes.

5. Viewing apparatus according to claim 1 further comprising means for causing said suspension section to rotate about its longitudinal axis.

6. Viewing apparatus according to claim 1 further comprising means responsive to said pivotal movement of the arm, of the head section, and of the camera means, to bias each said element into alignment with the suspension section, the arm and the head section respectively, and clutch means associated with said actuator means for interconnecting the actuator, the arm and head section for optionally effecting pivotal movement of the arm and camera means and for disconnecting the actuator means from the arm and head section to enable said biasing means to effect alignment of each of said arm, said head section, and said camera means with the suspension section should failure of the actuator means occur.

7. Viewing apparatus for remote examination of an internal cavity comprising: support means; said support means comprising a suspension section and a head section, and an arm connecting said two sections; said arm being connected to one end of said suspension section by a joint so as to be pivotable on an axis transverse to the longitudinal axis of said suspension section; said head section being connected to said arm by a joint so as to be pivotable on an axis transverse to the longitudinal axis of said arm and substantially parallel to said axis interconnecting said suspension section and said arm; linkage means interconnecting said arm and said head section for pivoting said head section on the arm-head section axis when said arm is pivoted on said arm-suspension section axis, said joints and linkage being so formed and operable with the sections connected thereto to permit said head section, arm, and suspension section to assume common alignment along an axis extending in the same direction as the longitudinal axis of said suspension section; power means for effecting pivotal movement of said arm on the arm-suspension section axis; means for rotating said head section on its longitudinal axis, which axis is substantially perpendicular to the arm-head section pivotal axis; television camera means mounted on said head section for pivotal movement about an axis transverse to the longitudinal axis of said head section, and power means for pivoting said camera on said axis; whereby when said arm is in alignment with said suspension section, said head section is in alignment with both of said other sections to permit insertion into and withdrawal from the cavity to be examined.

8. Viewing apparatus as in claim 7 further comprising means for rotating said suspension section about its longitudinal axis.

9. Viewing apparatus as in claim 7 further comprising means for pivoting said camera so that its longitudinal axis is substantially parallel to the longitudinal axis of said head section when said power means for pivoting said camera fails; and means for pivoting said arm and said head section into alignment with said suspension section upon attempted withdrawal of the apparatus from a cavity to be examined when said power means for pivoting said arm fails.

10. Viewing apparatus according to claim 7 further comprising a source of illumination carried by said head section.

11. Viewing apparatus according to claim 7 further comprising means for indicating the relative positions of said pivotable and rotatable members when said members are disposed in a cavity to be examined.

References Cited in the file of this patent

UNITED STATES PATENTS

| | | |
|---|---|---|
| 2,124,892 | Nichols | July 26, 1938 |
| 2,211,088 | Arnold | Aug. 13, 1940 |
| 2,334,475 | Claudet | Nov. 16, 1943 |
| 2,355,086 | Lang | Aug. 8, 1944 |
| 2,421,437 | Ryan | June 3, 1947 |
| 2,849,530 | Fleet | Aug. 26, 1958 |
| 2,877,368 | Sheldon | Mar. 10, 1959 |

OTHER REFERENCES

Nucleonics, vol. 14, No. 5, May 1956, page 110.
Nuclenoics, vol. 14, No. 12, December 1956, S–22–S–23.